(12) United States Patent
Baldanzini et al.

(10) Patent No.: US 12,486,781 B2
(45) Date of Patent: Dec. 2, 2025

(54) DUAL PURPOSE INTEGRATED GEAR FOR HYBRID TRAIN APPLICATION

(71) Applicant: NUOVO PIGNONE TECNOLOGIE—S.R.L., Florence (IT)

(72) Inventors: Fabio Baldanzini, Florence (IT); Giuliano Milani, Florence (IT); Gaspare Maragioglio, Florence (IT); Joseph Watson, Pershore POST-WML (GB); Fabrizio Malvaldi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/873,953

(22) PCT Filed: Jun. 12, 2023

(86) PCT No.: PCT/EP2023/025279
§ 371 (c)(1),
(2) Date: Dec. 11, 2024

(87) PCT Pub. No.: WO2023/241823
PCT Pub. Date: Dec. 21, 2023

(65) Prior Publication Data
US 2025/0188845 A1    Jun. 12, 2025

(30) Foreign Application Priority Data

Jun. 16, 2022   (IT) .......................... 102022000012785

(51) Int. Cl.
*F01D 15/10* (2006.01)
*F02C 3/107* (2006.01)
(52) U.S. Cl.
CPC .............. *F01D 15/10* (2013.01); *F02C 3/107* (2013.01); *F05D 2260/40311* (2013.01)
(58) Field of Classification Search
CPC . F01D 15/10; F02C 3/107; F05D 2260/40311
See application file for complete search history.

(56) References Cited

U.S. PATENT DOCUMENTS

| | | |
|---|---|---|
| 2015/0176485 A1 | 6/2015 | Gabelloni et al. |
| 2016/0230771 A1 | 8/2016 | Dobat et al. |
| 2022/0106909 A1 | 4/2022 | Braun et al. |

FOREIGN PATENT DOCUMENTS

WO    WO-2022042884 A1 *  3/2022  ............. F01D 15/10

* cited by examiner

*Primary Examiner* — Joseph Ortega
(74) *Attorney, Agent, or Firm* — Mintz, Levin, Cohn, Ferris, Glovsky and Popeo, P.C. US

(57) ABSTRACT

A hybrid train system comprising at least one gas turbine to drive a load, and an electric machine unit, also connected to the load. A clutch is installed between the gas turbine and the load. Also, an integrated reduction gear unit is interposed between the load and the electric machine unit, to adapt to different operating speeds.

10 Claims, 3 Drawing Sheets

DUAL PURPOSE INTEGRATED GEAR FOR HYBRID TRAIN APPLICATION

CROSS REFERENCE TO RELATED APPLICATIONS

This application is a National Stage Entry of Patent Cooperation Treaty Application No. PCT/EP2023/025279, filed on Jun. 12, 2023, entitled "Dual Purpose Integrated Gear for Hybrid Train Application," and claims benefit of and priority to Italian Patent Application No. 102022000012785, filed on Jun. 16, 2022." The disclosures of which are incorporated herein by reference in their entirety.

TECHNICAL FIELD

The present disclosure concerns a dual-purpose integrated gear for hybrid train application for a hybrid configuration train system, provided with an electric motor/generator, and, integrated with the compressor shaft line, a reduction gear unit.

BACKGROUND ART

Gas turbines are often used for providing torque to a load, such as a compressor or the like, for instance in the field of liquid natural gas and in general in the oil and gas industry. The gas turbine is usually connected to a load, as mentioned a compressor, a pump, or any rotary equipment, through a rotating shaft or rotating transmission assemblies.

More specifically, referring to Liquefied Natural Gas (LNG) processing, LNG is liquefied by a liquefaction process, where the natural gas is cooled using refrigeration cycles, so that it becomes liquid to be stored and transported. For cooling the LNG a refrigerant is cooled by a compressor, then it is condensed and expanded, to remove heat from the natural gas, which flows in a heat exchanger. The compressors are normally driven by gas turbines.

In the last years, an electric machine is also included in the above layout. Configurations where along the shaft line there is a gas turbine a load and an electric machine are usually known and referred to as hybrid train configurations, hybrid train systems, hybrid turbo-compressor trains, or simply hybrid trains. In such configurations, the electric machine can operate as an electric motor, such as a helper, supplying a torque alternatively to the load (e.g., the compressor), for example when the gas turbine cannot operate, or directly to the gas turbine, e.g. during a start-up phase.

A known configuration, comprises, connected in series, a gas (or steam) turbine, a load, such as a compressor, connected to the gas turbine by a transmission assembly. Specifically, the transmission assembly comprises a first transmission shaft, having an end connected to the gas turbine, a second transmission shaft, having an end connected to the load, and a clutch, connecting the first and the second transmission shafts. The clutch is operated to mechanically decouple or couple the two transmission shafts, to transmit power generated by the gas turbine to the load. The hybrid train system comprises also the electric machine connected to the load.

The electric machine can also operate as a generator, for instance when excess power is generated by the gas turbine than that normally required by the load. In this case, the power is transformed by the electric machine into the electric energy, and then injected into a public power grid, for example.

Gas turbines and electric machines have usually different operating speeds, so transmission torque issues arise in designing hybrid trains. Specifically, the electrical machine can be selected within a referenced solution for operation at 1500 or 1800 RPM (in case of 4 poles machine), or 3000/3600 RPM (in case 2 poles machine). This enhances the supplier availability and potential commonality with pure power generation applications.

Typically, electric machines have operating speed ranges lower than that of the gas turbines. It is a hybrid train design issue adapting the speed of an electric machine to that of the gas turbine. In the hybrid train systems of the prior art, usually, the electric motor is necessarily overdesigned. However, this implies higher costs, weight, and footprint increase. In addition, there are coupling problems between the electric motor and the load, where a bidirectional transmission of the torque at variable speeds is required, for allowing the transmission of the torque to drive the load when the electric machine operates as a motor, or for being driven by the load when the electric machine operates as a generator.

This implies rotor-dynamic limitations and design hindrances of the mechanical coupling between the load and the electric machine. Accordingly, an improved torque transmission connection of the electric machine would be welcomed in the technology. More in general, it would be desirable to provide a torque transmission arrangement that allows the torque compatibility transmission between the electric machine (lower speed) and the load, which, being directly connected to the gas turbine, is operated at a higher speed, especially when the electric machine operates as a motor, namely transmits torque to the load.

SUMMARY

In one aspect, the subject matter disclosed herein is directed to a hybrid train system, having a load, such as a compressor or a pump, to be driven by a torque and a gas turbine for generating the driving torque to drive the load. The gas turbine operates at first rotating speed belonging to a first operating rotating speed range. Also the gas turbine is operatively connected to the load. The hybrid train system also comprises an electric machine unit, mechanically connected to the load, and a rotating shaft, mechanically connecting the load and the electric machine unit. The electric machine unit is capable of operating at a second rotating speed belonging to a second operating rotating speed range, wherein the second speed is lower than the first speed of the gas turbine. Also, the hybrid train system comprises an integrated reduction gear unit, such as of epicyclical type, connected to the electric machine unit and to the rotating shaft. The integrated reduction gear unit is capable of transmitting the torque from the electric machine unit to the load and vice-versa. Furthermore, the integrated reduction gear unit is adapted to match the first rotating speed of the gas turbine and the second rotating speed of the electric machine unit.

In another aspect of the subject matter disclosed herein, the integrated reduction gear unit comprises a central sun wheel, having a high-speed flange, mechanically connectable to the rotating shaft, an internal gear ring, having internal teeth, a set of star wheels, arranged within the internal gear ring and engaging with the internal teeth of the internal gear ring, a low-speed flange, mechanically connected to the internal gear ring, and to the electric machine unit, and a joint, which connects the central sun wheel and the rotating shaft, for the torque transmission.

A further aspect of the present disclosure is drawn to the fact that the hybrid train system comprises a mechanical oil pump, mechanically connected to the integrated reduction gear unit to operate it. The mechanical oil pump comprises an upper and lower coupling flanges, for coupling the mechanical oil pump to the integrated reduction gear unit.

In another aspect of the subject matter disclosed herein, the hybrid train system comprises a torque limiter device, coupled to the low-speed flange, capable of decoupling the electric machine unit from the rotating shaft in case a torque excess is transmitted through the rotating shaft. The torque limiter device may comprise a shear bolt coupling support bearing, a collar, surrounding the shear bolt coupling support bearing, wherein the collar is arranged matched to the low-speed flange, and one or more shear pins, each one having a shear neck and arranged to connect the collar and the low-speed flange, wherein the share pins are adapted to break in case the torque transmitted through the rotating shaft exceeds a presettable threshold. In another embodiment, the low-speed flange may have a flat surface. The collar may have a flat surface, indented to be matched to the flat surface of the low-speed flange. The collar may have one or more seats, obtained on the flat surface. Also, the torque limiter device comprises one or more axial springs, each one housed in one respective seat, wherein the axial springs are capable of separating the collar and the low-speed flange in case of a break of the shear pins.

In another aspect of the subject matter disclosed herein, the electric machine unit is configured to operate as electric motor, to transmit torque to the load, and as generator, to receive torque from the load. The electric machine unit is connected to the power grid, so that when the electric machine unit may operate as electric motor, the power grid powers supply the electric machine unit, while when the electric machine unit operates as genera-tor, the electric machine unit injects power in the power grid.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Gas turbines are used for driving loads, such as compressors and the like, which are connected to a shaft. Recently, so-called hybrid train systems are spreading in the market, which integrate also an electric machine. The gas turbines and the electric motors are usually not compatible since they operate at different speeds.

To avoid designing too bulky electric machines, according to one aspect, the present subject matter is directed to the integration of an integrated reduction gear unit, capable of adapting the operating speed range of the gas turbine to that of the electric machine, in a bi-directional way, while transmitting the torque.

Figure 1:
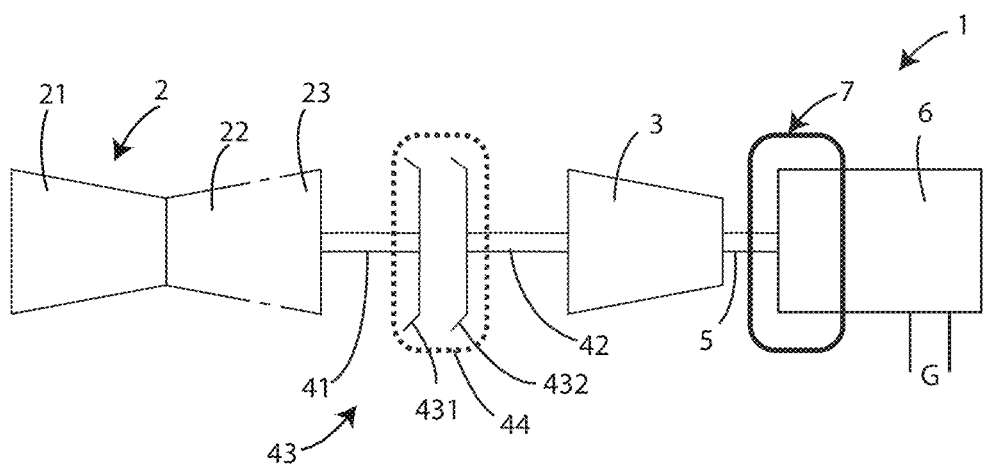
FIG. 1 illustrates a schematic of a hybrid train system according to a first embodiment.

Referring now to the drawings, FIG. 1 shows a hybrid train system 1 according to a first embodiment. The hybrid train system 1 comprises a gas turbine 2 and a load 3, to be driven by the gas turbine 2. The gas turbine 2 is operated at a first speed, which typically can range 65%-105% of the nominal speed.

The gas turbine 2 comprises a gas compressor 21, capable of compressing air taken from the environment, which is delivered to a combustor 22. In the combustor 22 fuel is added to the airflow and a fuel/air mixture is formed and ignited. The combustion gas generated in the combustor is delivered to the high-pressure turbine 23 and partly expands therein, generating mechanical power. The mechanical power generated by the high-pressure turbine 23 is used to drive the gas-generator compressor 21.

The load 3 is connected to the gas turbine by a transmission assembly 4. Specifically, the transmission assembly 4 comprises a first transmission shaft 41, having an end connected to the gas turbine 2, a second transmission shaft 42, having an end connected to the load 3, and a clutch 43.

In the illustrated layout of the hybrid train system 1, the clutch 43 comprises clutch discs, namely a first 431 and a second 432 clutch disc, respectively connected to the first transmission shaft 41 and to the second transmission shaft 42. The clutch discs 431 and 432 are capable of engaging power transmission. The clutch 43 is contained in a containment case 44.

The hybrid train system 1 also comprises an electric machine unit 6, mechanically connected to the load 3 by a rotating shaft 5. The electric machine unit 6 can operate either as an electric motor, thus providing torque to the load 3, or as a generator, thus transforming the torque received through the rotating shaft 5 in electric power.

In the embodiment shown, the load 3 is a compressor, however, in other embodiment, the load can be a different one, such as a pump, and the like.

The hybrid train system 1 also comprises an integrated reduction gear unit 7, connected to the rotating shaft 5 and the electric machine unit 6.

The integrated reduction gear unit 7 is adapted to adjust the operating speed range of the electric machine unit 6, which can operate at a second operating speed range, lower than the operating speed of the gas turbine 2. In general, an electric machine unit 6 can operate at 1.500-1.800 rpm (in case of 4 poles machine) or 3.000-3.600 rpm (in case 2 poles machine).

The integrated reduction gear unit 7 can be operated bi-directionally, namely, it can reduce or increase the speed between the point it is connected to, as better explained below. In particular, when the electric machine unit 6 operates as an electric motor, namely, as mentioned, supplying a torque to the load 3, the integrated reduction gear unit 7 increases the speed on the rotating shaft 5, for driving the load unit 6. In other words, it increases the rotating speed taken from the second operating speed range, to a speed of the first operating speed range, so that the rotating shaft 5 can transmit a torque adapted to drive the load 3. Instead, when the electric machine unit 6 operates as a generator, it transforms the torque received through the rotating shaft 5, generated by the gas turbine 2, into electric energy, which can be injected for instance in the power grid G, or it can be used to charge battery packs, or for driving other loads. The integrated reduction gear unit 7 in this case reduces a speed belonging to the first operating speed range, to a speed belonging to the second operating speed range, wherein, as said, the secondo is lower than the first.

In the embodiment at issue, the rotation of the rotating shaft 5 is always in the same direction, which can be clockwise or counterclockwise, either the electric machine unit 6 operates as a motor or generator.

The relation between the torque and the speed is $$T = \frac{P}{v}$$

where T is the torque vector, v is the speed, and P is the power. Therefore, the integrated reduction gear unit 7 operates as a speed transformer or speed adapter.

Figure 2:
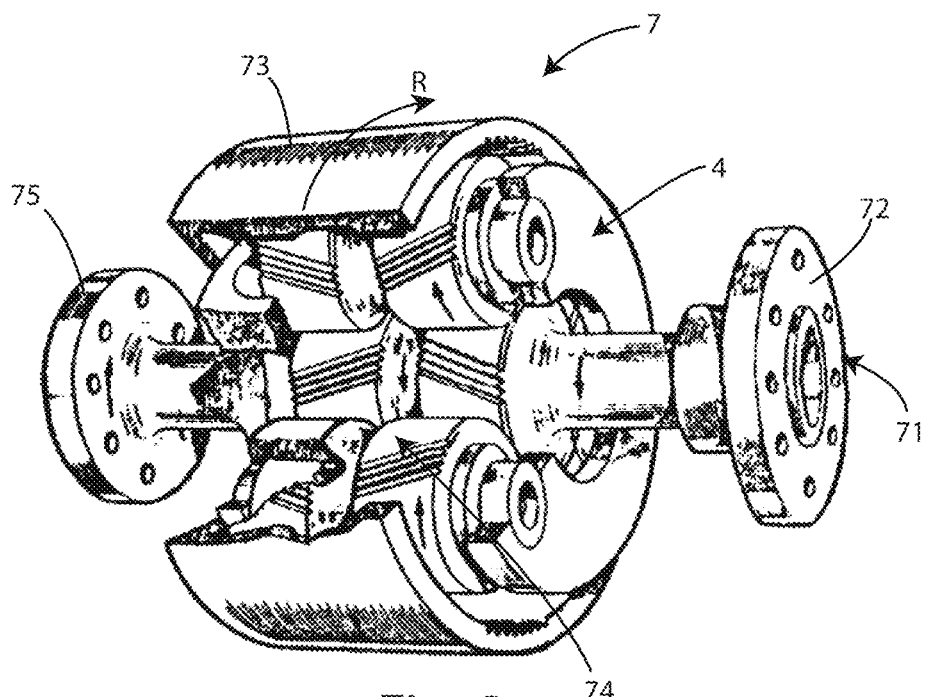
FIG. 2 illustrates an integrated reduction gear unit of the epicyclical type.

An example of integrated reduction gear unit 7 is illustrated in FIG. 2, which is an epicyclical type gear, comprising a central sun wheel 71, having a high-speed flange 72, connectable to the high-speed source, namely, in this case, to the load unit 6 through the rotating shaft 5. The load unit 6, as said, operates mainly at the gas turbine 2 speed, which is higher than the electric machine unit 6 speed.

The integrated reduction gear unit 7 comprises also an internal gear ring 73, also called anulus, having internal teeth (not shown in the figure). The internal gear ring 73 in operation rotates according to the arrow R. Within the internal gear ring 73 there are arranged a set of star wheels, collectively indicated with the reference number 74, mechanically connected to a low-speed flange 75, to be connected to the electric machine unit 6. The set of star wheels 74 engages with the internal teeth of the internal gear ring 73.

The epicyclical type integrated reduction gear unit 7 is bidirectional, namely, it can transmit and transform the torque and the speed in both the directions, allowing the operation of the electric machine unit 6 at the second speed range either as a motor, as well as a generator.

In other embodiments, other types of integrated reduction gear unit 7 can be used.

It is in general a requirement to minimize the train footprint and impacts on auxiliaries due to limited space availability within a usual customer plant. When the original turbo-compressor equipment is driven by a high-speed gas turbine 2, this would imply selecting a high-speed variable speed drive systems (VSDS) (restricted available supplier spectrum, given also the active front end variable frequency drive (VFD)). At the same time, traditional gears would result in a much higher train footprint.

Figure 3:
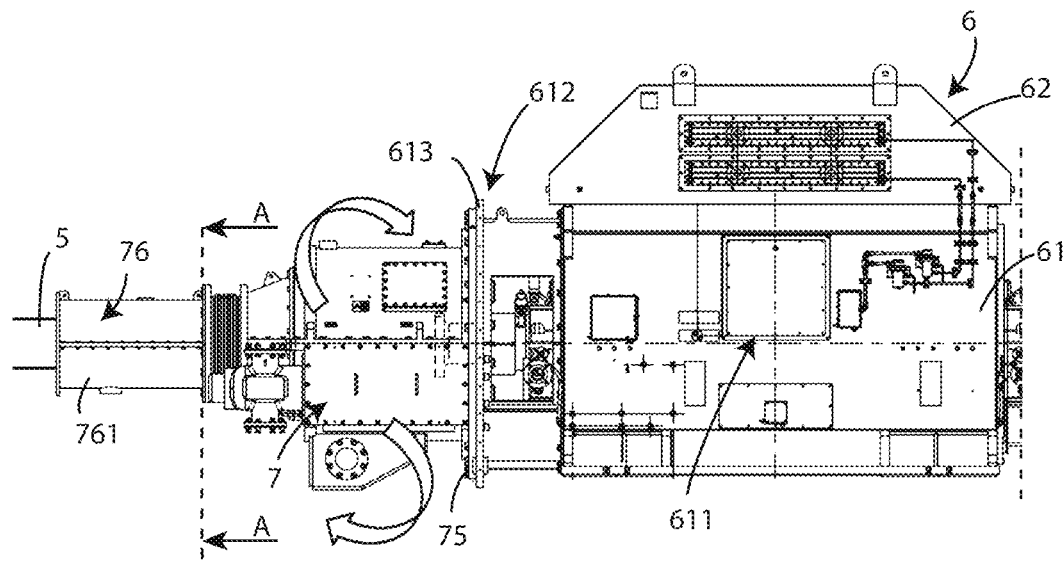
FIG. 3 illustrates the embodiment of the coupling an electric machine unit to a rotating shaft of hybrid train system according to a second embodiment.
Figure 4:
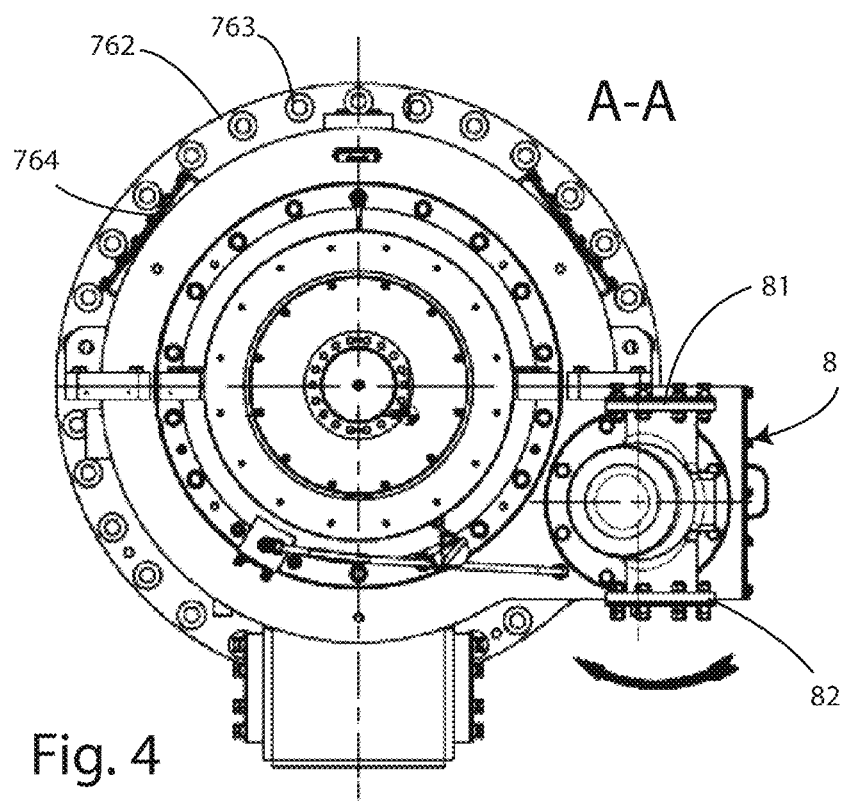
FIG. 4 illustrates a cross-section of FIG. 3, taken along the section line A-A.

Referring to FIGS. 3 and 4, it is illustrated another embodiment of coupling the electric machine unit 7 to the rotating shaft 5, by adapting the rotating speed. Specifically, it is shown an epicycloid, cantilever integrated reduction gear unit 7.

In this case, the speed reduction on the VSDS is achieved through an epicycloid gear, cantilever on the electric machine, or pedestal type, being the VSDS active front end type, the epicyclical gear shall be designed to withstand the bi-directional torque and variable speed operation.

Specifically, continuing referring to FIG. 3, it is illustrated the electric machine unit 6 comprises the electric machine 61, which, as said is operable either as an electric motor or as a generator, and a cooler 62, arranged over the electric machine 61 to extract heat during its operation. The electric machine 61 comprises also electrical connections, generally indicated with the reference number 611, and a coupling flange 612, with the relevant coupling crown 613, whereby the electric machine 61 is connected to the integrated reduction gear unit 7, which, in the embodiment shown, is of epicyclical type, but can also be of any other type. The coupling crown 613 is mechanically coupled to the low-speed flange 75 of the integrated reduction gear unit 7.

Finally, still referring to FIG. 3, the integrated reduction gear unit 7 comprises also a joint 76, which connects the central sun wheel 71 and the rotating shaft 5, for the torque transmission. The joint comprises a body 761, and a connecting flange 762, the latter connected to the body. The connecting flange 762 has a plurality of holes 763 for the connections by a plurality of bolts. Also, it can be seen the inspection cover 764, for allowing the inspections within the body in case of misfunctions or torque transmission problems.

In the embodiment shown, it is also installed a mechanical oil pump 8, mechanically connected to the integrated reduction gear unit 7. Specifically, one of the wheels of the integrated reduction gear unit 7 is used to operate the mechanical oil pump 8. The mechanical oil pump 8 comprises an upper 81 and a lower 82 coupling flanges, for coupling the mechanical oil pump 8 to the integrated reduction gear unit 7.

In one embodiment the mechanical pump 8 can be driven by a kinematic chain (not shown in the figures), comprising, for example, an auxiliary shaft, connected to the pump 8, and one toothed wheel keyed to the auxiliary shaft, and one or more transmission means, such as toothed wheels and the like, connecting the toothed wheel and therefore the auxiliary shaft, to the low-speed flange 75 or to in general to rotating parts of the integrated reduction gear unit 7.

Usually, mechanical oil pumps are provided in hybrid train systems, however, they are not integrated into the system itself, but they are just arranged close to the same, increasing the overall footprint of the plant. As it is apparent, the integration of the mechanical oil pump 8 allows containment of the size of the hybrid train system 1.

The epicycloid gear would allow fitting not only a mechanical oil pump, providing benefits in terms also of reduced lube oil console footprint, as mentioned above, but also a torque limiter device (TLD) to limit over torques coming from electrical machine, providing benefits to the shaft line design (e.g. coupling).

Figure 5:
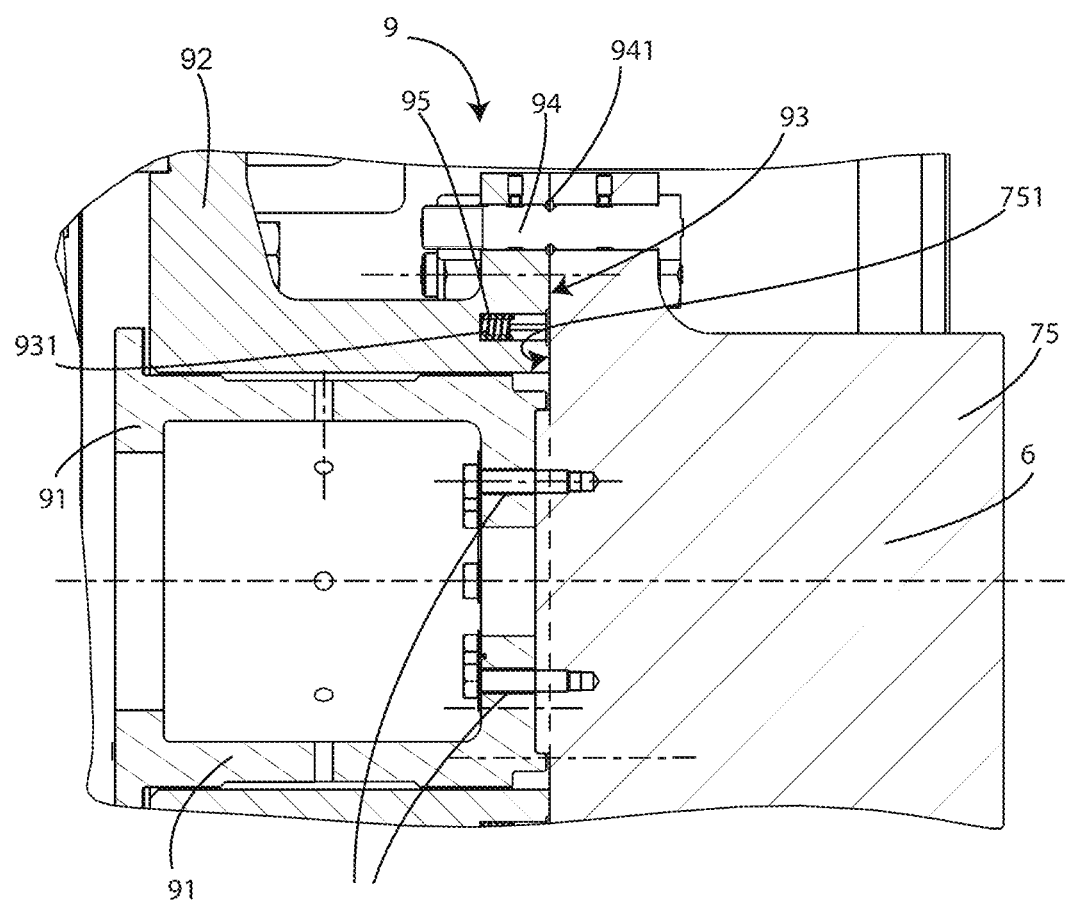
FIG. 5 illustrates a torque limiter device integrated in the hybrid train system of FIG. 3.

Specifically, referring now to FIG. 4, it is shown a partial longitudinal sections of high-speed flange 72. A torque limiter device 9, referring now to FIG. 5, which is coupled to the low-speed flange 75. In particular, it is possible to see that the torque limiting device 9 comprises a shear bolt coupling support bearing 91, having centering bolts 92, for centering the position of the torque limiter device 9 and the low-speed flange 75. The torque limiter device 9 also comprises a collar 92, surrounding the shear bolt coupling support bearing 91. The collar 92 has a flat surface 93, intended to be matched to a corresponding flat surface 751 of the low-speed flange 75. One or more shear pins 94, arranged through both the collar 92 and the low-speed flange 75. Each one of the shear pins 94 has a relevant shear neck 941. The shear pins 94 connect the collar 92 and the low-speed flange 75. Specifically, the shear pins 94 keep matched the flat surface 93 of the collar and the flat surface 751 of the low-speed flange 75. Finally, the collar 92 has one or more seats 931, obtained on the flat surface 93, and the torque limiter device 9 comprises a set of axial springs 95, each one arranged preloaded into a relevant seat 921. The axial springs 95 are capable of separating the same case of break of the shear pins 94.

In other embodiments, other types of torque-limiting devices can be installed, such as torque clocker types, and the like.

The hybrid train system 1 described above operates as follows.

When the gas turbine 2 operates, the torque can be transmitted by the clutch 43 to the load 3, which, in the case at issue, as said, is a compressor. The two clutch discs 431 and 432 of the clutch 43 can be separated, thus not transmitting the torque to the load 3. When the clutch discs 521 and 522 are connected, the torque generated by the gas turbine 2 can be transmitted, from the gas turbine 2 to the load 3.

In case of excess torque production, the electric machine unit 6 is operated as a generator. The rotating shaft 5 can thus transmit the excess torque to the electric machine unit 6, for it to be transformed in electric energy, e.g. to be injected into the power grid G.

The rotating shaft 5 rotates at the speed belonging to the first operating speed range, namely at the operating speed of the gas turbine 2, which is typically around 10.000 rpm or more. As mentioned above, such rotating speed is far more than the operating speed of the usual electric machine units 6, which has, as mentioned above, typically rotate at an operating speed ranging from 1.500-3.600 rpm.

The integrated reduction gear unit 7, which receives the torque through the high-speed flange 72 from the rotating shaft 5, reduces the speed of the rotating shaft 5, namely a speed belonging to the first operating range, by means of the internal gear ring 73 and the star wheels 74. The speed is then reduced from the (higher) operating speed of the gas turbine 2, to the (lower) operating speed of the electric machine unit 6, namely a speed of the second operating speed range, so as to drive the same electric machine unit 6 by the low-speed flange 75. At the same time, the gears of the integrated reduction gear unit 7 operate the oil pump 8, which pumps the oil and the lubricant into the entire hybrid train system 1.

The integrated reduction gear unit 7 is a passive device and can be affected by torque pecks or similar misfunctions. In this case, the torque limiter device 9 protects the hybrid train system 1. In fact, in normal operations, the shear pins 94 of the torque limiter device 9 experience a shear force. When the transmitted torque causes a force that exceeds the pins' shear strength, namely a certain shear strength, which can be preset by proper design, the shear pins 94 breaks along the shear neck 941 of each shear pins 94, thus mechanically decoupling the electric machine unit 6 from the rotating shaft 5, and therefore by the gas turbine 2 and the load 3.

Also, the axial springs 95, releasing the potential energy stored within, perform a safe separation of the low-speed flange 75 from shear bolt coupling support bearing 91 of the torque limiter device 9, and therefore from the rotating shaft 5.

In a symmetrical way, in case the electric machine unit 6 operates as an electric motor, so as to drive the compressor 3, e.g., as a helper, the (lower) operating speed generated by the electric machine unit 6 to transmit the power (and therefore the torque) to the load 3, is increased by the integrated reduction gear unit 7, which then operates in a bi-directional way. The electric machine unit 6 takes the power from the power grid G.

Also in this case, in case of torque peaks, or any other problem on the rotating shaft 5, the torque limiter device 9 decouples the electric machine unit 6 from the rotating shaft 5, and therefore by the gas turbine 2 and the load 3.

An advantage of the present disclosure concerns an enhanced VSDS supplier spectrum, with apparent commercial benefits.

Another advantage of the present disclosure is that the integration of gear can be used, in terms of design, both for pure power generation or hybrid applications. In addition, the integrated gear can be equipped with a torque limiter device to limit over torques coming from the electrical machine, achieving rotor-dynamic benefits on both the electrical machine and the compressor design.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures, or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A hybrid train system, comprising:
 a load to be driven by a torque;
 a gas turbine for generating the driving torque to drive the load, wherein the gas turbine operates at first rotating speed belonging to a first operating rotating speed range, and wherein the gas turbine is operatively connected to the load;
 an electric machine unit, mechanically connected to the load; and
 a rotating shaft, mechanically connecting the load and the electric machine unit, wherein the electric machine unit is capable of operating at a second rotating speed belonging to a second operating rotating speed range, wherein the second speed is lower than the first speed of the gas turbine;
 an integrated reduction gear unit, connected to the electric machine unit and to the rotating shaft, wherein the integrated reduction gear unit is capable of transmitting the torque from the electric machine unit to the load and vice-versa, wherein the integrated reduction gear unit is adapted to match the first rotating speed of the gas turbine and the second rotating speed of the electric machine unit, and wherein the integrated reduction gear unit is of epicyclical type; and a mechanical oil pump, mechanically connected to the integrated reduction gear unit to operate the mechanical oil pump, wherein the mechanical oil pump comprises an upper and a lower coupling flanges, for coupling the mechanical oil pump to the integrated reduction gear unit.

2. The hybrid train system of claim 1, wherein the integrated reduction gear unit comprises:
a central sun wheel, having a high-speed flange, mechanically connectable to the rotating shaft;
an internal gear ring, having internal teeth,
a set of star wheels, arranged within the internal gear ring and engaging with the internal teeth of the internal gear ring,
a low-speed flange, mechanically connected to the internal gear ring, and to the electric machine unit, and
a joint, which connects the central sun wheel and the rotating shaft, for transmission of the torque.

3. The hybrid train system of claim 1,
wherein the first operating rotating speed range of the gas turbine is comprised between 3,000 rpm and 12,000 rpm; and
wherein the second operating rotating speed range of the electric machine unit is comprised between 1,500 rpm and 1,800 rpm, or 3,000 rpm and 3,600 rpm.

4. The hybrid train system of claim 1, wherein the load is a compressor or a pump.

5. A hybrid train system, comprising:
a load to be driven by a torque;
a gas turbine for generating the driving torque to drive the load, wherein the gas turbine operates at first rotating speed belonging to a first operating rotating speed range, and wherein the gas turbine is operatively connected to the load;
an electric machine unit, mechanically connected to the load;
a rotating shaft, mechanically connecting the load and the electric machine unit, wherein the electric machine unit is capable of operating at a second rotating speed belonging to a second operating rotating speed range, wherein the second speed is lower than the first speed of the gas turbine;
an integrated reduction gear unit, connected to the electric machine unit and to the rotating shaft, wherein the integrated reduction gear unit is capable of transmitting the torque from the electric machine unit to the load and vice-versa, wherein the integrated reduction gear unit is adapted to match the first rotating speed of the gas turbine and the second rotating speed of the electric machine unit, and wherein the integrated reduction gear unit is of epicyclical type, wherein the integrated reduction gear unit comprises:
a central sun wheel, having a high-speed flange, mechanically connectable to the rotating shaft;
an internal gear ring, having internal teeth;
a set of star wheels, arranged within the internal gear ring and engaging with the internal teeth of the internal gear ring;
a low-speed flange, mechanically connected to the internal gear ring, and to the electric machine unit, and
a joint, which connects the central sun wheel and the rotating shaft, for transmission of the torque; and
a mechanical oil pump, mechanically connected to the integrated reduction gear unit to operate the mechanical oil pump, wherein the mechanical oil pump comprises an upper and a lower coupling flanges, for coupling the mechanical oil pump to the integrated reduction gear unit; and
a torque limiter device, coupled to the low-speed flange, capable of decoupling the electric machine unit from the rotating shaft in case a torque excess is transmitted through the rotating shaft.

6. The hybrid train system of claim 5, wherein the torque limiter device comprises:
a shear bolt coupling support bearing,
a collar, surrounding the shear bolt coupling support bearing, wherein the collar is arranged matched to the low-speed flange, and
one or more shear pins, each one having a shear neck and arranged to connect the collar and the low-speed flange, wherein the shear pins are adapted to break in case the torque transmitted through the rotating shaft exceeds a presettable threshold.

7. The hybrid train system of claim 6,
wherein the low-speed flange has a flat surface,
wherein the collar has a flat surface, indented to be matched to the flat surface of the low-speed flange,
wherein the collar has one or more seats, obtained on the flat surface, and
wherein the torque limiter device comprises one or more axial spring, each one housed in one respective seat, wherein the axial springs are capable of separating the collar and the low-speed flange in case of break of the shear pins.

8. A hybrid train system, comprising:
a load to be driven by a torque;
a gas turbine for generating the driving torque to drive the load, wherein the gas turbine operates at first rotating speed belonging to a first operating rotating speed range, and wherein the gas turbine is operatively connected to the load;
an electric machine unit, mechanically connected to the load; and
a rotating shaft, mechanically connecting the load and the electric machine unit, wherein the electric machine unit is capable of operating at a second rotating speed belonging to a second operating rotating speed range, wherein the second speed is lower than the first speed of the gas turbine;
an integrated reduction gear unit, connected to the electric machine unit and to the rotating shaft, wherein the integrated reduction gear unit is capable of transmitting the torque from the electric machine unit to the load and vice-versa, wherein the integrated reduction gear unit is adapted to match the first rotating speed of the gas turbine and the second rotating speed of the electric machine unit; and
a transmission assembly connecting the load and the gas turbine, wherein the transmission assembly comprises:
a first transmission shaft, having an end connected to the gas turbine;
a second transmission shaft, having an end connected to the load; and
a clutch having a first clutch disc, connected to the first transmission shaft, and a second clutch disc, connected to the second transmission shaft, wherein the first and the second clutch discs are capable of engaging power transmission.

9. The hybrid train system of claim 1, wherein the electric machine unit is configured to operate as an electric motor, to transmit torque to the load, and as a generator, to receive torque from the load.

10. The hybrid train system of claim 9, wherein the electric machine unit is connected to a power grid, wherein when the electric machine unit operates as an electric motor, the power grid powers supply the electric machine unit, while when the electric machine unit operates as a generator, the electric machine unit injects power in the power grid.

\* \* \* \* \*